(12) United States Patent
Li et al.

(10) Patent No.: US 11,480,772 B2
(45) Date of Patent: Oct. 25, 2022

(54) CAMERA OPTICAL LENS INCLUDING FIVE LENSES OF +--+- REFRACTIVE POWERS

(71) Applicant: AAC Optics Solutions Pte. Ltd., Singapore (SG)

(72) Inventors: Wanxia Li, Shenzhen (CN); Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 307 days.

(21) Appl. No.: 16/991,052

(22) Filed: Aug. 12, 2020

(65) Prior Publication Data

US 2021/0055522 A1    Feb. 25, 2021

(30) Foreign Application Priority Data

Aug. 19, 2019  (CN) .......................... 201910765487.5

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

FOREIGN PATENT DOCUMENTS

CN          109358414 A   *   2/2019   ......... G02B 13/0045

* cited by examiner

*Primary Examiner* — Wen Huang
(74) *Attorney, Agent, or Firm* — W&G Law Group

(57) ABSTRACT

The present disclosure provides a camera optical lens satisfying following conditions: $-0.35 \leq f1/f2 \leq -0.25$; $1.20 \leq (f1+f4)/f \leq 1.30$; $0.18 \leq d1/f \leq 0.22$; $2.80 \leq R3/f \leq 3.50$; and $-0.28 \leq (R9+R10)/(R9-R10) \leq -0.24$, where f denotes a focal length of the camera optical lens; f1, f2 and f4 respectively denote a focal length of a first, second and third lenses; d1 denotes an on-axis thickness of the first lens; R3 and R9 respectively denote a curvature radius of an object-side surface of the second and fifth lenses; and R10 denotes a curvature radius of an image-side surface of the fifth lens. The camera optical lens has a good optical performance and further meets the design requirements of wide angle and ultra-thinness.

9 Claims, 6 Drawing Sheets

CAMERA OPTICAL LENS INCLUDING FIVE LENSES OF +−−+− REFRACTIVE POWERS

TECHNICAL FIELD

The present disclosure relates to the field of optical lens, in particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a three-piece, four-piece, or even five-piece, six-piece lens structure. However, with the development of technology and the increase of the diverse demands of users, and as the pixel area of photosensitive devices is becoming smaller and smaller and the requirement of the camera optical lens on the imaging quality is improving constantly, although the common five-piece lens has a good optical performance, its optical power, lens spacing and lens shape setting are still unreasonable, resulting in the lens structure with the good optical performance fails to meet the design requirements of large aperture, ultra-thinness, and wide angle.

SUMMARY

The present disclosure seeks to provide a camera optical lens that a camera optical lens, aiming at solving the problem of insufficient wide angle and ultra-thinness of the traditional camera optical lens.

The technical solution of the present disclosure is as follows:

A camera optical lens comprising, from an object side to an image side: a first lens having a positive refractive power; a second lens having a negative refractive power; a third lens having a negative refractive power; a fourth lens having a positive refractive power; and a fifth lens having a negative refractive power;

where the camera optical lens satisfies following conditions:

$-0.35 \leq f1/f2 \leq -0.25$;

$1.20 \leq (f1+f4)/f \leq 1.30$;

$0.18 \leq d1/f \leq 0.22$;

$2.80 \leq R3/f \leq 3.50$; and $-0.28 \leq (R9+R10)/(R9-R10) \leq -0.24$;

where f denotes a focal length of the camera optical lens; f1 denotes a focal length of the first lens; f2 denotes a focal length of the second lens; f4 denotes a focal length of the fourth lens; d1 denotes an on-axis thickness of the first lens; R3 denotes a curvature radius of an object-side surface of the second lens; R9 denotes a curvature radius of an object-side surface of the fifth lens; and R10 denotes a curvature radius of an image-side surface of the fifth lens.

As an improvement, the camera optical lens further satisfies following condition:

$-0.45 \leq f5/f \leq -0.35$;

where f5 denotes a focal length of the fifth lens.

As an improvement, the camera optical lens further satisfies following conditions:

$0.36 \leq f1/f \leq 1.12$;

$-2.89 \leq (R1+R2)/(R1-R2) \leq -0.95$; and $0.08 \leq d1/TTL \leq 0.27$;

where R1 denotes a curvature radius of an object-side surface of the first lens; R2 denotes a curvature radius of an image-side surface of the first lens; and TTL denotes a total optical length from the object-side surface of the first lens to an image surface of the camera optical lens along an optical axis.

As an improvement, the camera optical lens further satisfies following conditions:

$-5.91 \leq f2/f \leq -1.43$;

$0.91 \leq (R3+R4)/(R3-R4) \leq 3.61$; and $0.03 \leq d3/TTL \leq 0.09$;

where R4 denotes a curvature radius of an image-side surface of the second lens; d3 denotes an on-axis thickness of the second lens; and TTL denotes a total optical length from an object-side surface of the first lens to an image surface of the camera optical lens along an optical axis.

As an improvement, the camera optical lens further satisfies following conditions:

$-14.56 \leq f3/f \leq -2.49$;

$-6.18 \leq (R5+R6)/(R5-R6) \leq -0.96$; and $0.04 \leq d5/TTL \leq 0.12$;

where f3 denotes a focal length of the third lens; R5 denotes a curvature radius of an object-side surface of the third lens; R6 denotes a curvature radius of an image-side surface of the third lens; d5 denotes an on-axis thickness of the third lens; and TTL denotes a total optical length from an object-side surface of the first lens to an image surface of the camera optical lens along an optical axis.

As an improvement, the camera optical lens further satisfies following conditions:

$0.23 \leq f4/f \leq 0.83$;

$0.52 \leq (R7+R8)/(R7-R8) \leq 1.86$; and $0.11 \leq d7/TTL \leq 0.39$;

where R7 denotes a curvature radius of an object-side surface of the fourth lens; R8 denotes a curvature radius of an image-side surface of the fourth lens; d7 denotes an on-axis thickness of the fourth lens; and TTL denotes a total optical length from an object-side surface of the first lens to an image surface of the camera optical lens along an optical axis.

As an improvement, the camera optical lens further satisfies following condition:

$0.03 \leq d9/TTL \leq 0.20$;

where d9 denotes an on-axis thickness of the fifth lens; and TTL denotes a total optical length from an object-side surface of the first lens to an image surface of the camera optical lens along an optical axis.

As an improvement, the camera optical lens further satisfies following condition:

$FOV \geq 74.00°$;

where FOV denotes a field of view of the camera optical lens.

As an improvement, the camera optical lens further satisfies following condition:

$TTL/IH \leq 1.55$;

where TTL denotes a total optical length from an object-side surface of the first lens to an image surface of the camera optical lens along an optical axis; and IH denotes an image height of the camera optical lens.

The present disclosure is advantageous in:

Compared with the existing technology, the camera optical lens according to the present disclosure has a good optical performance and characteristics of a large aperture, wide angle and ultra-thinness, and is particularly suitable for mobile phone camera lens assemblies and WEB camera lenses composed of a high pixel CCD, CMOS and other camera elements.

DETAILED DESCRIPTION OF EMBODIMENTS

The present disclosure will be further illustrated with reference to the accompanying drawings and embodiments.

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
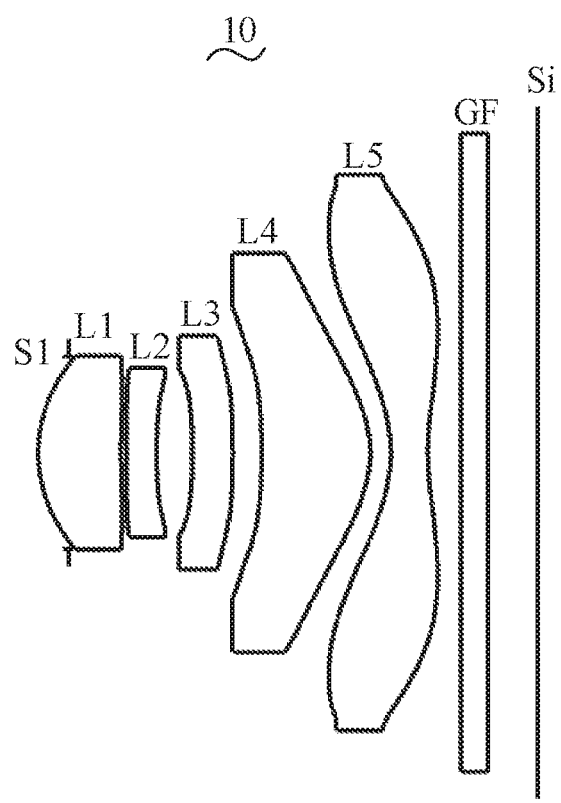
FIG. 1 is a schematic diagram of a structure of a camera optical lens according to Embodiment 1 of the present disclosure.

Referring to FIGS. 1 to 4 together, the present disclosure provides a camera optical lens 10 of Embodiment 1. In FIG. 1, the left side is an object side and the right side is an image side. The camera optical lens 10 mainly includes five lenses arranged coaxially, which from the object side to the image side are a first lens L1, a second lens L2, a third lens L3, a fourth lens L4 and a fifth lens L5. An aperture S is further provided on an object-side surface of the first lens L1, and a glass plate GF is provided between the fifth lens L5 and an image surface Si. The glass plate GF can be a glass cover plate or an optical filter.

In an embodiment, the first lens L1 has a positive refractive power; the second lens L2 has a negative refractive power; the third lens L3 has a negative refractive power; the fourth lens L4 has a positive refractive power; and the fifth lens L5 has a negative refractive power.

Herein, f denotes a focal length of the camera optical lens 10; f1 denotes a focal length of the first lens L1; f2 denotes a focal length of the second lens L2; f4 denotes a focal length of the fourth lens L4; d1 denotes an on-axis thickness of the first lens L1; R3 denotes a curvature radius of an object-side surface of the second lens L2; R9 denotes a curvature radius of an object-side surface of the fifth lens L5; and R10 denotes a curvature radius of an image-side surface of the fifth lens L5. The f, f1, f2, f4, d1, R3, R9, and R10 satisfy following conditions:

$$-0.35 \leq f1/f2 \leq -0.25 \quad (1)$$

$$1.20 \leq (f1+f4)/f \leq 1.30 \quad (2)$$

$$0.18 \leq d1/f \leq 0.22 \quad (3)$$

$$2.80 \leq R3/f \leq 3.50 \quad (4)$$

$$-0.28 \leq (R9+R10)/(R9-R10) \leq -0.24 \quad (5)$$

Herein, condition (1) specifies a ratio between the focal length of the first lens L1 to the focal length of the second lens L2, which can effectively balance a spherical aberration and a field curvature amount of the camera optical lens 10 within a range specified by condition (1).

Condition (2) specifies a ratio between a sum of the focal length of the first lens L1 and the focal length of the fourth lens L4 to the total focal length of the camera optical lens 10, such that within a range specified by condition (2), the camera optical lens 10 can have a better imaging quality and a lower sensitivity through a reasonable distribution of the focal length.

Condition (3) specifies a ratio between the on-axis thickness of the first lens L1 to the total focal length of the camera optical lens 10, thereby facilitating compressing the total length of the camera optical lens 10 and realizing an ultra-thin effect within a range specified by condition (3).

Condition (4) specifies a ratio between the curvature radius of the object-side surface of the third lens L3 to the total focal length of the camera optical lens 10, thereby facilitating improving an optical performance of the camera optical lens 10 within a range specified by condition (4).

Condition (5) specifies a shape of the fifth lens L5, which can alleviate a deflection degree of a light passing through the lens and effectively reduce the aberration within a range specified by condition (5).

In an embodiment, f5 denotes a focal length of the fifth lens L5. The f5 and f satisfy following condition:

$$-0.45 \leq f5/f \leq -0.35 \quad (6)$$

Condition (6) specifies a ratio between the focal length of the fifth lens L5 to the total focal length of the camera optical lens 10, such that within a range specified by condition (6), the camera optical lens 10 can have a better imaging quality and a lower sensitivity through a reasonable distribution of the focal length.

In an embodiment, R1 denotes a curvature radius of the object-side surface of the first lens L1; R2 denotes a curvature radius of an image-side surface of the first lens L; and TTL denotes from the object-side surface of the first lens L1 to the image surface Si of the camera optical lens 10. The f1, f, R1, R2, d1 and TTL satisfy following conditions:

$$0.36 \leq f1/f \leq 1.12 \quad (7)$$

$$-2.89 \leq (R1+R2)/(R1-R2) \leq -0.95 \quad (8)$$

$$0.08 \leq d1/TTL \leq 0.27 \quad (9)$$

Herein, condition (7) specifies a ratio between the focal length of the first lens L1 to the total focal length of the camera optical lens 10. Within a range specified by condition (7), the first lens L1 has an appropriate positive refractive power, thereby facilitating reducing an aberration of the camera optical lens while facilitating a development towards ultra-thin and wide-angle lenses.

Condition (8) specifies a shape of the first lens L1 such that within a range specified by condition (8), the first lens L can effectively correct a spherical aberration of the camera optical lens.

Condition (9) specifies a ratio between a thickness of the first lens L1 to the total track length of the camera optical lens 10, which facilitates achieving the ultra-thin effect within a range specified by condition (9).

In an embodiment, R4 denotes a curvature radius of an image-side surface of the second lens L2; and d3 denotes an on-axis thickness of the second lens L2. The f2, f, R3, R4, d3, TTL satisfy following conditions:

$$-5.91 \leq f2/f - 1.43 \quad (10)$$

$$0.91 \leq (R3+R4)/(R3-R4) \leq 3.61 \quad (11)$$

$$0.03 \leq d3/TTL \leq 0.09 \quad (12)$$

Herein, condition (10) specifies a ratio between the focal length of the second lens L2 to the total focal length of the camera optical lens 10. Within a range specified by condition (10), by controlling a negative refractive power of the second lens L2 within a reasonable range, a correction of the aberration of the camera optical lens is facilitated.

Condition (11) specifies a shape of the second lens L2. Within a range specified by condition (11), a development towards ultra-thin and wide-angle lenses would facilitate correcting a problem of an on-axis aberration.

Condition (12) specifies a ratio between a thickness of the second lens L2 to the total track length of the camera optical lens 10, which facilitates achieving the ultra-thin effect within a range specified by condition (12).

In an embodiment, f3 denotes a focal length of the third lens L3; R5 denotes a curvature radius of an object-side surface of the third lens L3; R6 denotes a curvature radius of an image-side surface of the third lens L3; and d5 denotes an on-axis thickness of the third lens L3. The f3, f, R5, R6, d5 and TTL satisfy following conditions:

$$-14.56 \leq f3/f \leq -2.49 \quad (13)$$

$$-6.18 \leq (R5+R6)/(R5-R6) \leq -0.96 \quad (14)$$

$$0.04 \leq d5/TTL \leq 0.12 \quad (15)$$

Herein, condition (13) specifies a ratio between the focal length of the third lens L3 to the total focal length of the camera optical lens 10, such that within a range specified by condition (13), the camera optical lens 10 can have a better imaging quality and a lower sensitivity through a reasonable distribution of a refractive power.

Condition (14) specifies a shape of the third lens L3, thereby facilitating shaping of the third lens L3 and avoiding bad shaping and generation of stress due to an the overly large surface curvature of the third lens L3 within a range specified by condition (14).

Condition (15) specifies a ratio between a thickness of the third lens L3 to from the object-side surface of the first lens L1 to the image surface Si of the camera optical lens 10 along an optical axis 10, which facilitates achieving the ultra-thin effect within a range specified by condition (15).

In an embodiment, R7 denotes a curvature radius of an object-side surface of the fourth lens L4; R8 denotes a curvature radius of an image-side surface of the fourth lens L4; and d7 denotes an on-axis thickness of the fourth lens L4. The f4, f, R7, R8, d7 and TTL satisfy following conditions:

$$0.23 \leq f4/f \leq 0.83 \quad (16)$$

$$0.52 \leq (R7+R8)/(R7-R8) \leq 1.86 \quad (17)$$

$$0.11 \leq d7/TTL \leq 0.39 \quad (18)$$

Herein, condition (16) specifies a ratio between the focal length of the fourth lens L4 to the total focal length of the camera optical lens 10, such that within a range specified by condition (16), the camera optical lens 10 can have a better imaging quality and a lower sensitivity through a reasonable distribution of a refractive power.

Condition (17) specifies a shape of the fourth lens L4. Within a range specified by condition (17), a development towards ultra-thin and wide-angle lens would facilitate correcting such a problem as an off-axis aberration.

Condition (18) specifies a ratio between a thickness of the fourth lens L4 to the total track length of the camera optical lens 10, which facilitates achieving the ultra-thin effect within a range specified by condition (18).

In an embodiment, d9 denotes an on-axis thickness of the fifth lens L5. The d9 and TTL satisfy following condition:

$$0.03 \leq d9/TTL \leq 0.20 \quad (19)$$

Condition (19) specifies a ratio between a thickness of the fifth lens L5 to the total track length of the camera optical lens 10, which facilitates achieving the ultra-thin effect within a range specified by condition (19).

In addition, in the camera optical lens 10 provided in an embodiment, the surface of each lens can be set as an aspheric surface. The aspheric surface is easily made into a shape other than a spherical surface, and more control variables are obtained to absorb the aberration, thereby decreasing the number of lenses used. Therefore, the total length of the camera optical lens 10 can be effectively reduced. In an embodiment, both the object-side surface and the image-side surface of each lens are aspheric.

It is worth mentioning that since the first lens L1, the second lens L2, the third lens L3, the fourth lens L4 and the fifth lens L5 have the aforementioned structure and parameter relationship, the camera optical lens 10 can reasonably distribute the refractive power, the interval and the shape of each lens, and thus correct various aberrations.

In an embodiment, TTL/IH≤1.55 and FOV≥74.00°, where TTL denotes a total optical length from the object-side surface of the first lens L1 to the image surface Si of the camera optical lens 10 along an optical axis; IH denotes an image height of the camera optical lens; and FOV denotes a field of view. In this way, the camera optical lens 10 has the good optical imaging performance while meeting the design requirements of wide-angle and ultra-thinness.

In the following, examples will be used to describe the camera optical lens 10 of the present disclosure. The symbols recorded in each example will be described as follows. Furthermore, the focal length, on-axis distance, curvature radius, on-axis thickness, total optical length from the object-side surface of the first lens to the image surface of the camera optical lens along the optical axis, inflexion point position, and arrest point position are all in units of mm.

In addition, inflexion points and/or arrest points can be arranged on the object-side surface and/or the image-side surface of each lens, so as to satisfy the demand for high quality imaging. The description below can be referred for specific implementations.

The following show the design data of the camera optical lens 10 shown in FIG. 1.

Table 1 lists the curvature radius R of the object-side surface and the curvature radius R of the image-side surface of the first lens L1 to the fifth lens L5 constituting the camera optical lens 10 in Embodiment 1 of the present disclosure, the on-axis thickness of each lens, the distance d between two adjacent lenses, a refractive index nd and an Abbe number vd.

TABLE 1

|     | R       | d           |     | nd     |     | vd    |
| --- | ------- | ----------- | --- | ------ | --- | ----- |
| S1  | ∞       | d0 = -0.235 |     |        |     |       |
| R1  | 1.121   | d1 = 0.639  | nd1 | 1.5444 | v1  | 55.82 |
| R2  | 6.188   | d2 = 0.041  |     |        |     |       |
| R3  | 10.530  | d3 = 0.234  | nd2 | 1.6700 | v2  | 19.39 |
| R4  | 3.611   | d4 = 0.278  |     |        |     |       |
| R5  | -6.272  | d5 = 0.312  | nd3 | 1.6700 | v3  | 19.39 |
| R6  | -12.281 | d6 = 0.222  |     |        |     |       |
| R7  | -8.385  | d7 = 0.841  | nd4 | 1.5444 | v4  | 55.82 |
| R8  | -0.895  | d8 = 0.158  |     |        |     |       |
| R9  | -1.205  | d9 = 0.287  | nd5 | 1.5438 | v5  | 56.03 |
| R10 | 2.050   | d10 = 0.257 |     |        |     |       |
| R11 | ∞       | d11 = 0.210 | ndg | 1.5168 | vg  | 64.17 |
| R12 | ∞       | d12 = 0.382 |     |        |     |       |

In the above table, meanings of various symbols will be described as follows.

S1: aperture;
R: curvature radius of an optical surface, a central curvature radius for a lens;
R1: curvature radius of the object-side surface of the first lens L1;
R2: curvature radius of the image-side surface of the first lens L1;
R3: curvature radius of the object-side surface of the second lens L2;
R4: curvature radius of the image-side surface of the second lens L2;
R5: curvature radius of the object-side surface of the third lens L3;
R6: curvature radius of the image-side surface of the third lens L3;
R7: curvature radius of the object-side surface of the fourth lens L4;
R8: curvature radius of the image-side surface of the fourth lens L4;
R9: curvature radius of the object-side surface of the fifth lens L5;
R10: curvature radius of the image-side surface of the fifth lens L5;
R11: curvature radius of the object-side surface of the glass plate GF;
R12: curvature radius of the image-side surface of the glass plate GF;
d: on-axis thickness of a lens, an on-axis distance between lens;
d0: on-axis distance from the aperture Si to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the glass plate GF;
d11: on-axis thickness of the glass plate GF;
d12: on-axis distance from the image-side surface of the glass plate GF to the image surface Si;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
ndg: refractive index of the d line of the glass plate GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the glass plate GF.

TABLE 2

|    | Conic coefficient | Aspheric surface coefficients | | | |
| -- | --- | --- | --- | --- | --- |
|    | k | A4 | A6 | A8 | A10 |
| R1 | -5.4895E-02 | -2.4131E-02 | 2.3154E-01 | -1.4763E+00 | 4.5048E+00 |
| R2 | -2.2926E+02 | -8.1156E-02 | -6.8739E-01 | 4.7997E+00 | -1.6172E+01 |

TABLE 2-continued

| | | | | | |
|---|---|---|---|---|---|
| R3 | 1.3428E+02 | −1.8800E−01 | 4.2517E−01 | 2.3312E−01 | −3.5965E−01 |
| R4 | 2.6598E+01 | −1.8148E−01 | 2.5884E+00 | −2.0733E+01 | 1.0985E+02 |
| R5 | 2.0724E+00 | −3.9011E−01 | 1.2842E+00 | −1.1276E+01 | 5.9154E+01 |
| R6 | −3.8790E+02 | −2.9301E−01 | 5.4684E−02 | 8.8145E−01 | −3.7245E+00 |
| R7 | −5.8292E−02 | −2.1473E−01 | 1.7700E−01 | −4.5188E−01 | 7.5999E−01 |
| R8 | −1.0210E+00 | 4.2533E−01 | −5.8088E−01 | 6.7327E−01 | −4.9221E−01 |
| R9 | −5.5559E+00 | −7.2325E−02 | 7.0158E−02 | −2.2126E−02 | 4.0933E−03 |
| R10 | −2.3202E+01 | −1.0975E−01 | 8.5442E−02 | −5.5110E−02 | 2.1112E−02 |

| | Aspheric surface coefficients | | | | |
|---|---|---|---|---|---|
| | A12 | A14 | A16 | A18 | A20 |
| R1 | −7.7621E+00 | 7.4107E+00 | −6.2199E+00 | 6.8153E+00 | −4.1777E+00 |
| R2 | 3.2412E+01 | −3.8834E+01 | 2.4464E+01 | −1.5034E+01 | 1.5209E+01 |
| R3 | 1.1613E−01 | −5.0213E+00 | 8.9422E+00 | −3.0259E+00 | 7.7097E−01 |
| R4 | −3.4558E+02 | 5.8917E+02 | −3.8291E+02 | −1.9761E+02 | 2.3769E+02 |
| R5 | −1.8351E+02 | 3.1061E+02 | −2.2371E+02 | 3.4636E+00 | −2.3343E+01 |
| R6 | 8.8142E+00 | −9.6125E+00 | 3.6831E+00 | 2.7782E−01 | −1.8740E−01 |
| R7 | −4.8626E−01 | 1.3273E−01 | −3.1347E−02 | −2.7392E−03 | 7.3510E−03 |
| R8 | 2.0885E−01 | −4.7193E−02 | 4.6570E−03 | −1.5429E−04 | 2.0386E−05 |
| R9 | −9.8266E−04 | 2.6798E−04 | −3.1748E−05 | −8.0294E−07 | 3.0260E−07 |
| R10 | −4.7886E−03 | 6.3973E−04 | −4.4784E−05 | 4.2975E−07 | 1.3172E−07 |

In table 2, K is a conic coefficient, and A4, A6, A8, A10, A12, A14, A16, A18 and A20 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20}$$

For convenience, an aspheric surface of each lens surface uses the aspheric surfaces shown in the above formula. However, the present disclosure is not limited to the aspherical polynomials form shown in the formula.

TABLE 3

| | Number(s) of inflexion points | Inflexion point position 1 | Inflexion point position 2 |
|---|---|---|---|
| P1R1 | | | |
| P1R2 | 1 | 0.265 | |
| P2R1 | | | |
| P2R2 | | | |
| P3R1 | | | |
| P3R2 | 2 | 0.725 | 0.775 |
| P4R1 | 2 | 0.855 | 1.015 |
| P4R2 | 2 | 0.885 | 1.375 |
| P5R1 | 1 | 0.895 | |
| P5R2 | 2 | 0.435 | 2.015 |

TABLE 4

| | Number(s) of arrest points | Arrest point position 1 |
|---|---|---|
| P1R1 | | |
| P1R2 | 1 | 0.495 |
| P2R1 | | |
| P2R2 | | |
| P3R1 | | |
| P3R2 | | |
| P4R1 | | |
| P4R2 | | |
| P5R1 | 1 | 1.775 |
| P5R2 | 1 | 0.975 |

Table 3 and Table 4 show design data of inflexion points and arrest points of the camera optical lens 10 according to an embodiment of the present disclosure. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

In addition, the following Table 13 further lists the values corresponding to various parameters and conditions in Embodiment 1.

Figure 2:
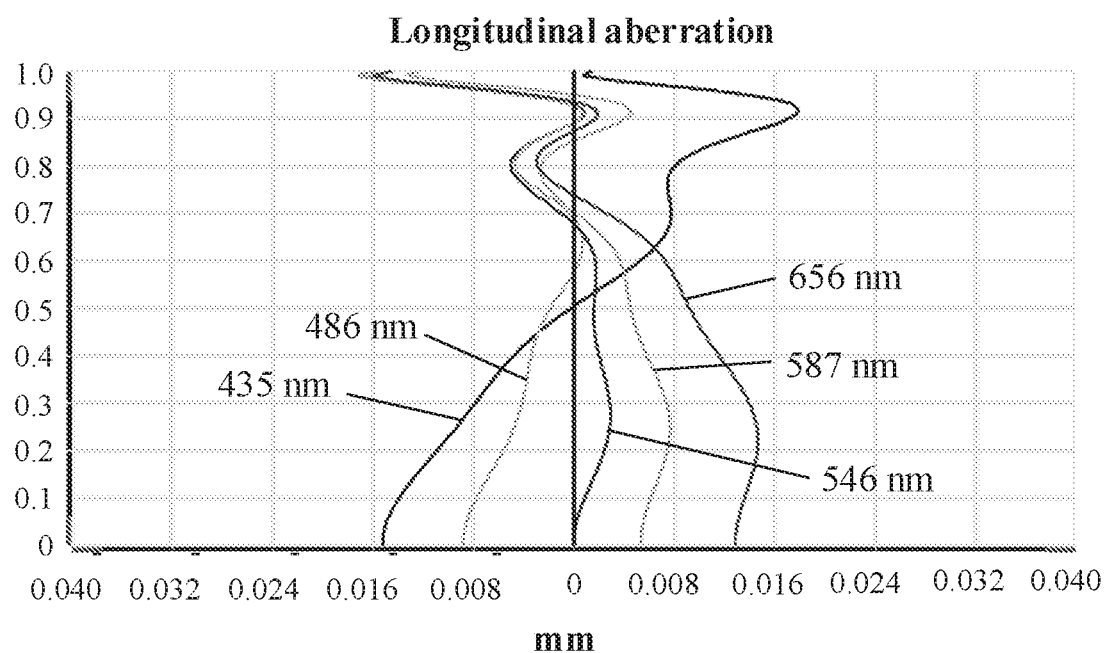
FIG. 2 is a schematic diagram of a longitudinal aberration of the camera optical lens shown in FIG. 1.
Figure 3:
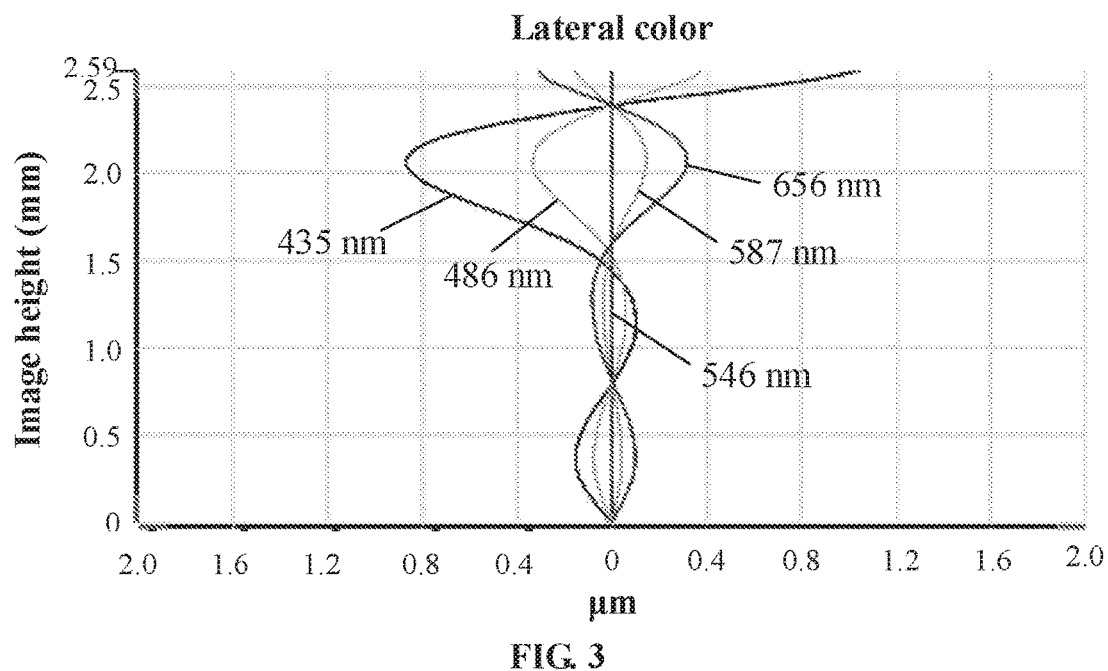
FIG. 3 is a schematic diagram of a lateral color of the camera optical lens shown in FIG. 1.
Figure 4:
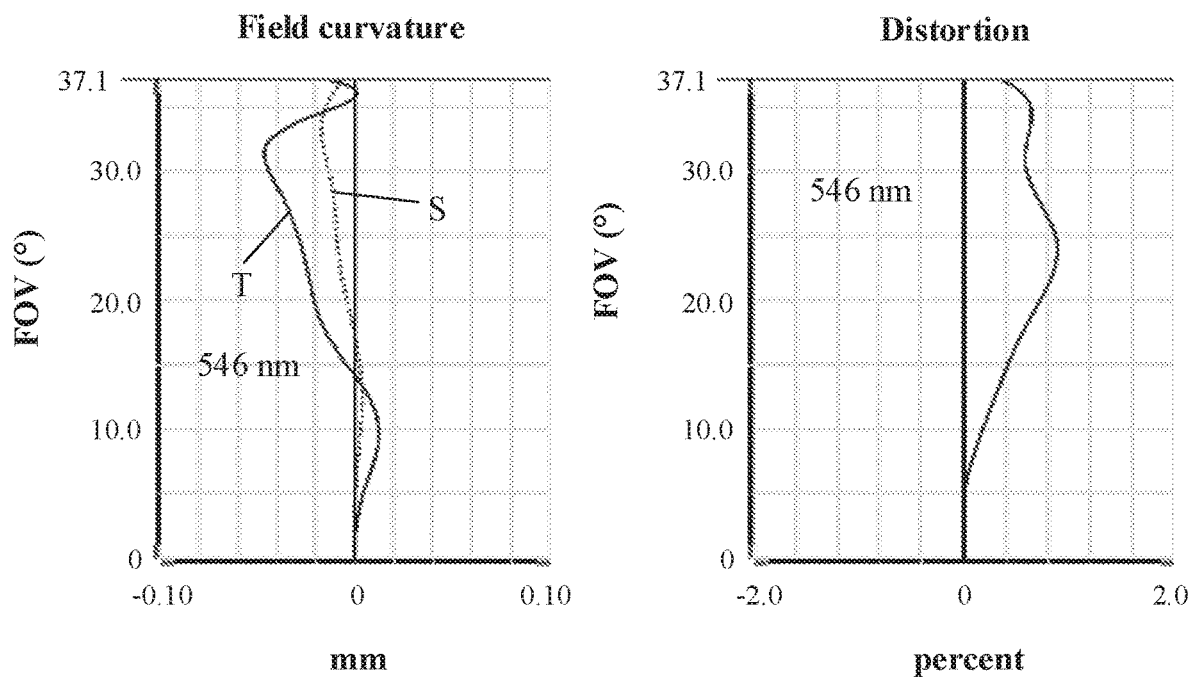
FIG. 4 is a schematic diagram of a field curvature and a distortion of the camera optical lens shown in FIG. 1.

FIG. 2 and FIG. 3 illustrate a longitudinal aberration and a lateral color with wavelengths of 435 nm, 486 nm, 546 nm, 587 nm and 656 nm after passing the camera optical lens 10, respectively. FIG. 4 illustrates a field curvature and a distortion with a wavelength of 546 nm after passing the camera optical lens 10. A field curvature S in FIG. 4 is a field curvature in a sagittal direction, and T is a field curvature in a tangential direction.

In an embodiment, an image height of the camera optical lens 10 is IH, a field of view is FOV, and an entrance pupil diameter is ENPD, where IH=2.59 mm, the FOV=74.20° in a diagonal direction, and ENPD=1.528. Thus, the camera optical lens 10 has a large aperture, ultra-thinness and wide angle, thereby achieving an excellent imaging performance.

Embodiment 2

Figure 5:
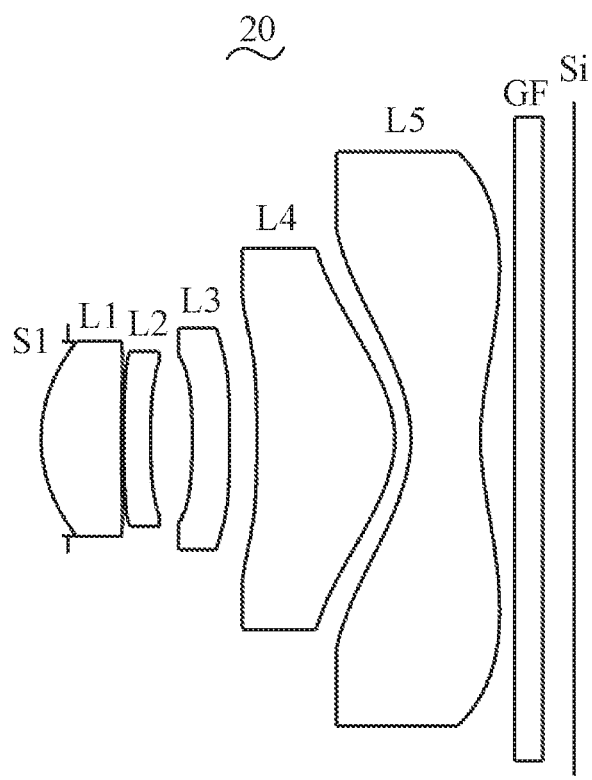
FIG. 5 is a schematic diagram of a structure of a camera optical lens according to Embodiment 2 of the present disclosure.

FIG. 5 is a schematic structural diagram of a camera optical lens 20 in Embodiment 2. Embodiment 2 is basically the same as Embodiment 1 and involves symbols in the following tables having the same meanings as Embodiment 1, so the same parts are not repeated here, and only the differences therebetween will be described in the following.

Table 5 and Table 6 show design data of a camera optical lens 20 in Embodiment 2 of the present disclosure.

TABLE 5

|     | R       | d            | nd    |     | vd    |       |
|-----|---------|--------------|-------|-----|-------|-------|
| S1  | ∞       | d0 = -0.205  |       |     |       |       |
| R1  | 1.150   | d1 = 0.601   | nd1   | 1.5444 | v1 | 55.82 |
| R2  | 6.524   | d2 = 0.019   |       |     |       |       |
| R3  | 9.272   | d3 = 0.200   | nd2   | 1.6700 | v2 | 19.39 |
| R4  | 3.826   | d4 = 0.315   |       |     |       |       |
| R5  | -6.812  | d5 = 0.282   | nd3   | 1.6700 | v3 | 19.39 |
| R6  | -37.623 | d6 = 0.203   |       |     |       |       |
| R7  | -43.193 | d7 = 1.037   | nd4   | 1.5444 | v4 | 55.82 |
| R8  | -0.828  | d8 = 0.120   |       |     |       |       |
| R9  | -1.055  | d9 = 0.522   | nd5   | 1.5438 | v5 | 56.03 |
| R10 | 1.868   | d10 = 0.257  |       |     |       |       |
| R11 | ∞       | d11 = 0.210  | ndg   | 1.5168 | vg | 64.17 |
| R12 | ∞       | d12 = 0.234  |       |     |       |       |

TABLE 6

| | Conic coefficient | Aspheric surface coefficients | | | |
|---|---|---|---|---|---|
| | k | A4 | A6 | A8 | A10 |
| R1  | 3.2462E-03  | -1.6201E-02 | 1.9838E-01  | -1.4433E+00 | 4.5362E+00  |
| R2  | -4.8538E+02 | -3.5317E-02 | -5.9054E-01 | 4.8359E+00  | -1.6459E+01 |
| R3  | 1.6725E+02  | -1.7167E-01 | 6.4925E-01  | -8.1170E-02 | -7.5649E-01 |
| R4  | 2.8088E+01  | -1.1159E-01 | 2.5494E+00  | -2.4372E+01 | 1.4218E+02  |
| R5  | 4.0890E+00  | -4.3380E-01 | 1.4247E+00  | -1.2444E+01 | 6.2973E+01  |
| R6  | 8.9012E+02  | -3.0498E-02 | 8.3943E-02  | 8.8178E-01  | -3.3956E+00 |
| R7  | 6.2598E+02  | -2.0785E-01 | 2.8283E-01  | -5.2750E-01 | 7.2604E-01  |
| R8  | -1.1641E+00 | 4.2531E-01  | -6.0517E-01 | 6.8823E-01  | -4.9485E-01 |
| R9  | -5.0116E+00 | -7.8458E-02 | 7.1929E-02  | -2.3394E-02 | 4.0626E-03  |
| R10 | -1.2822E+01 | -9.3494E-02 | 7.9356E-02  | -4.9408E-02 | 1.9364E-02  |

| | Aspheric surface coefficients | | | | |
|---|---|---|---|---|---|
| | A12 | A14 | A16 | A18 | A20 |
| R1  | -7.9306E+00 | 7.4694E+00  | -5.8272E+00 | 6.2167E+00  | -4.0888E+00 |
| R2  | 3.1814E+01  | -3.9046E+01 | 2.6128E+01  | -1.1898E+01 | 9.6219E+00  |
| R3  | -2.6851E-01 | -1.7377E+00 | 1.3530E+01  | -2.6903E+01 | 1.3821E+01  |
| R4  | -4.6343E+02 | 6.9560E+02  | 1.4032E+02  | -1.7903E+03 | 1.5896E+03  |
| R5  | -1.8834E+02 | 3.0139E+02  | -2.1442E+02 | 7.1485E+01  | -1.1723E+02 |
| R6  | 6.0483E+00  | -3.8872E+00 | -6.0750E-01 | 6.3128E-01  | 4.6839E-01  |
| R7  | -4.8481E-01 | 1.5295E-01  | -1.9386E-02 | -9.7240E-03 | 5.9736E-03  |
| R8  | 2.1102E-01  | -4.8638E-02 | 4.7141E-03  | 7.1310E-06  | -1.0266E-05 |
| R9  | -9.1002E-04 | 2.8948E-04  | -2.9288E-05 | -1.7472E-06 | -1.2799E-07 |
| R10 | -4.7907E-03 | 6.9290E-04  | -4.4723E-05 | -8.2050E-07 | 1.9166E-07  |

In table 6, K is a conic coefficient, and A4, A6, A8, A10, A12, A14, A16, A18 and A20 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20}$$

For convenience, an aspheric surface of each lens surface uses the aspheric surfaces shown in the above formula. However, the present disclosure is not limited to the aspherical polynomials form shown in the formula.

Table 7 and table 8 show design data of inflexion points and arrest points of each lens of the camera optical lens 20 lens.

TABLE 7

| | Number(s) of inflexion points | Inflexion point position 1 | Inflexion point position 2 | Inflexion point position 3 |
|---|---|---|---|---|
| P1R1 | 1 | 0.745 | | |
| P1R2 | 1 | 0.285 | | |
| P2R1 | | | | |
| P2R2 | | | | |

TABLE 7-continued

| | Number(s) of inflexion points | Inflexion point position 1 | Inflexion point position 2 | Inflexion point position 3 |
|---|---|---|---|---|
| P3R1 | | | | |
| P3R2 | | | | |
| P4R1 | 3 | 0.845 | 1.055 | 1.135 |
| P4R2 | 2 | 0.855 | 1.515 | |
| P5R1 | 2 | 0.935 | 1.755 | |
| P5R2 | 1 | 0.555 | | |

TABLE 8

| | Number of arrest points | Arrest point position 1 |
|---|---|---|
| P1R1 | | |
| P1R2 | 1 | 0.605 |
| P2R1 | | |
| P2R2 | | |
| P3R1 | | |
| P3R2 | | |
| P4R1 | | |
| P4R2 | | |
| P5R1 | | |
| P5R2 | 1 | 1.335 |

In addition, the following Table 13 further lists the values corresponding to various parameters and conditions in Embodiment 2.

Figure 6:
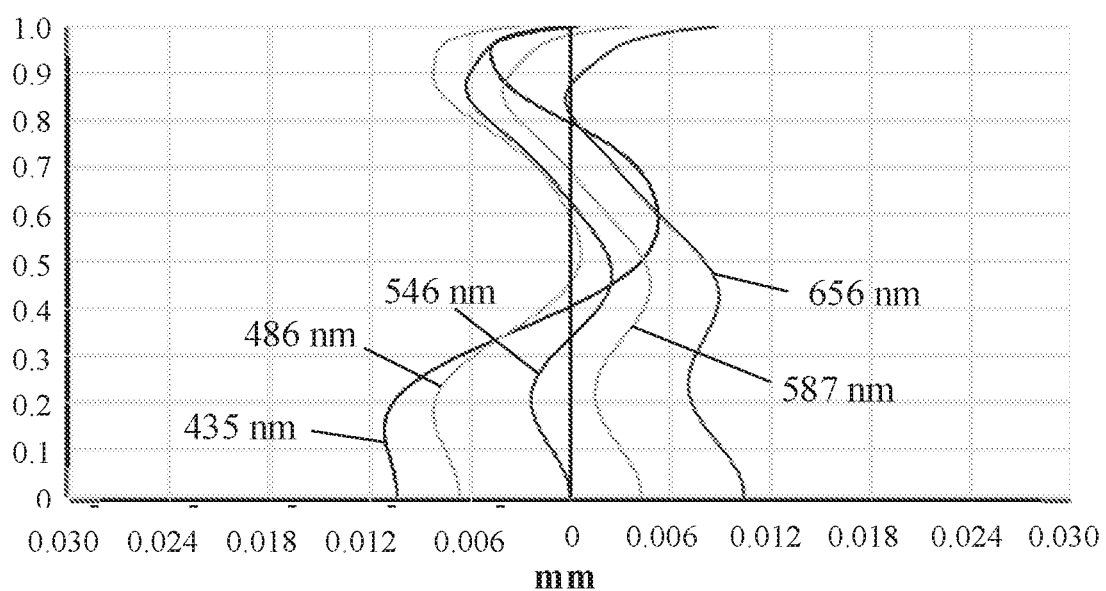
FIG. 6 is a schematic diagram of a longitudinal aberration of the camera optical lens shown in FIG. 5.
Figure 7:
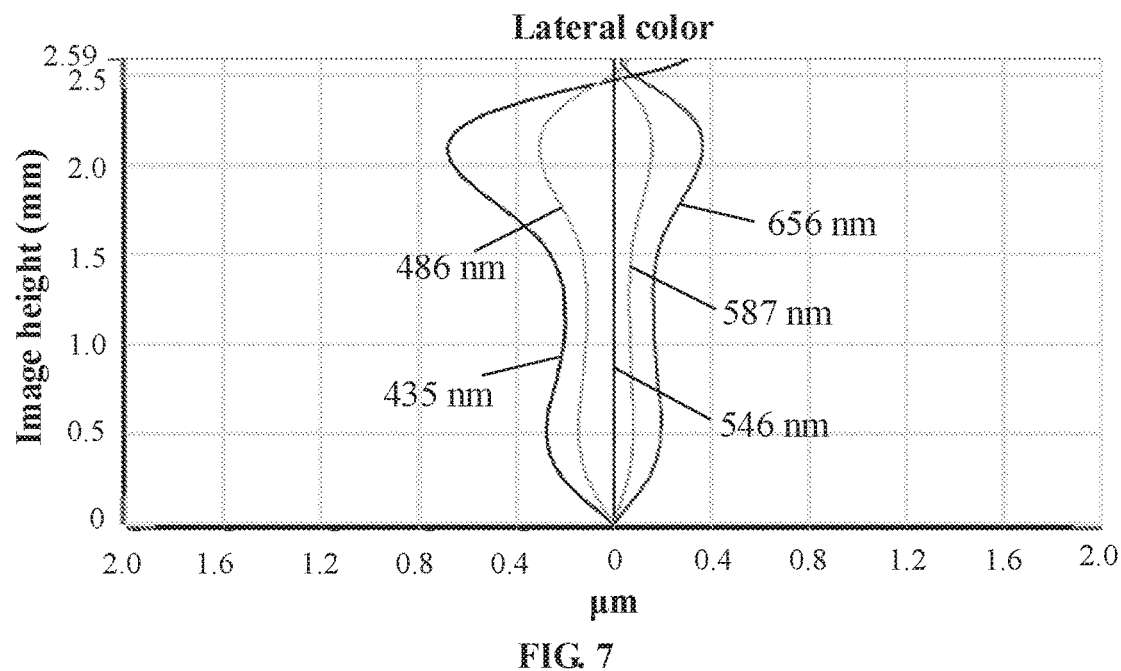
FIG. 7 is a schematic diagram of a lateral color of the camera optical lens shown in FIG. 5.
Figure 8:
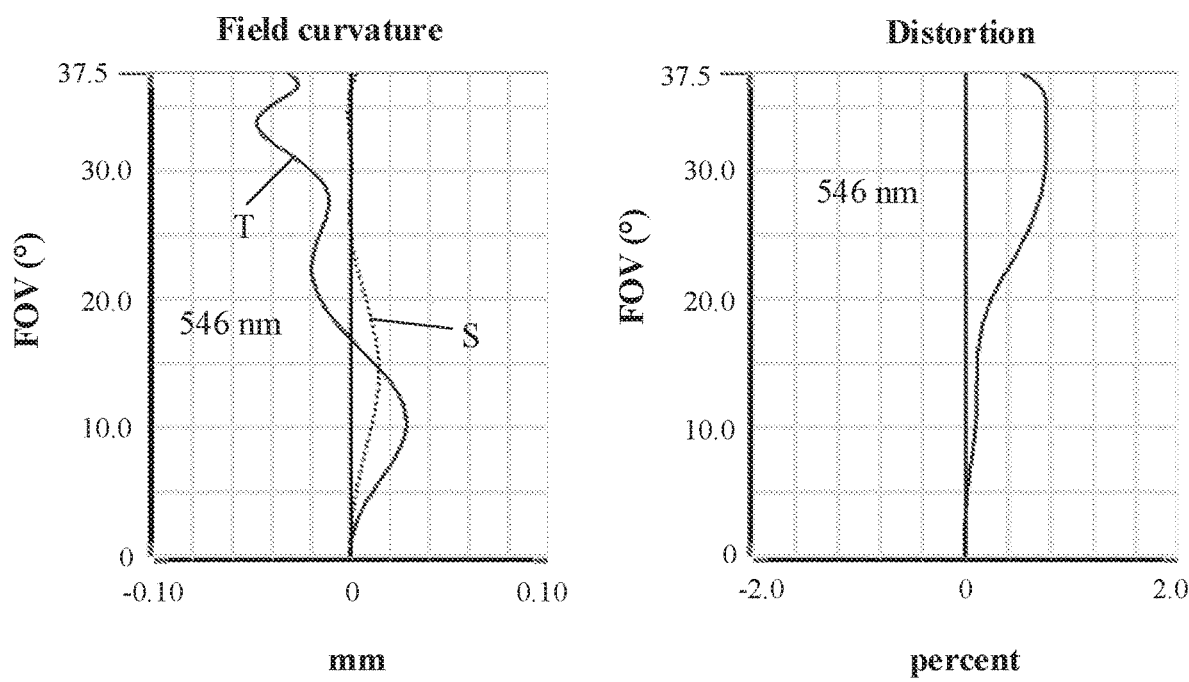
FIG. 8 is a schematic diagram of a field curvature and a distortion of the camera optical lens shown in FIG. 5.

FIG. 6 and FIG. 7 illustrate a longitudinal aberration and a lateral color with wavelengths of 435 nm, 486 nm, 546 nm, 587 nm and 656 nm after passing the camera optical lens 20, respectively. FIG. 8 illustrates a field curvature and a distortion with a wavelength of 546 nm after passing the camera optical lens 20. A field curvature S in FIG. 8 is a field curvature in a sagittal direction, and T is a field curvature in a tangential direction.

In an embodiment, an image height of the camera optical lens 20 is IH, a field of view is FOV, and an entrance pupil diameter is ENPD, where IH=2.59 mm, the FOV=75.00° in a diagonal direction, and ENPD=1.500. Thus, the camera optical lens 20 has a large aperture and is ultra-thin and wide-angled, thereby achieving an excellent imaging performance.

Embodiment 3

Figure 9:
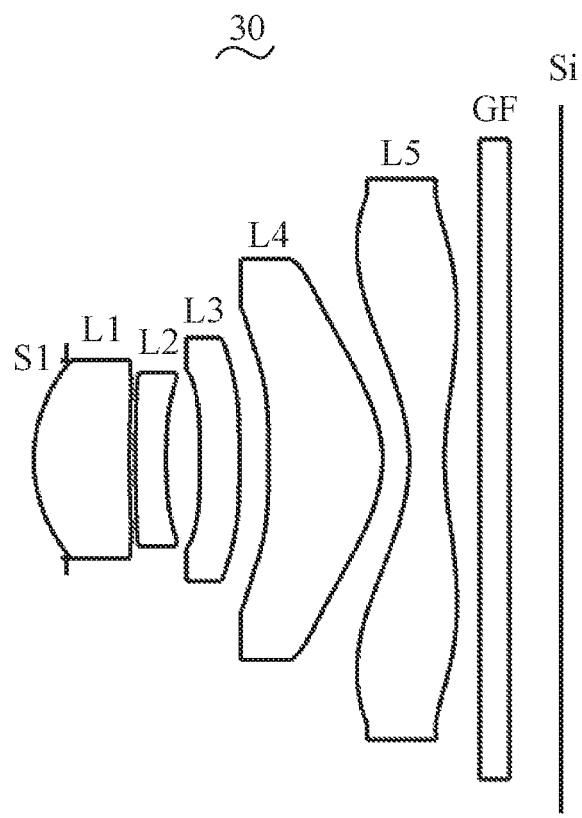
FIG. 9 is a schematic diagram of a structure of a camera optical lens according to Embodiment 3 of the present disclosure.

FIG. 9 is a schematic structural diagram of a camera optical lens 30 in Embodiment 3. Embodiment 3 is basically the same as Embodiment 1 and involves symbols in the following tables having the same meanings as Embodiment 1, so the same parts are not repeated here, and only the differences therebetween will be described in the following.

Table 9 and Table 10 show design data of a camera optical lens 30 in Embodiment 3 of the present disclosure.

TABLE 9

|  | R | d |  | nd |  | vd |
|---|---|---|---|---|---|---|
| S1 | ∞ | d0 = −0.235 |  |  |  |  |
| R1 | 1.125 | d1 = 0.685 | nd1 | 1.5444 | v1 | 55.82 |
| R2 | 6.178 | d2 = 0.044 |  |  |  |  |
| R3 | 11.228 | d3 = 0.219 | nd2 | 1.6700 | v2 | 19.39 |
| R4 | 3.270 | d4 = 0.244 |  |  |  |  |
| R5 | −10.007 | d5 = 0.282 | nd3 | 1.6700 | v3 | 19.39 |
| R6 | −27.353 | d6 = 0.212 |  |  |  |  |
| R7 | −11.494 | d7 = 0.816 | nd4 | 1.5444 | v4 | 55.82 |
| R8 | −0.917 | d8 = 0.193 |  |  |  |  |
| R9 | −1.290 | d9 = 0.251 | nd5 | 1.5438 | v5 | 56.03 |
| R10 | 2.109 | d10 = 0.256 |  |  |  |  |
| R11 | ∞ | d11 = 0.210 | ndg | 1.5168 | vg | 64.17 |
| R12 | ∞ | d12 = 0.374 |  |  |  |  |

TABLE 10

|  | Conic coefficient | Aspherical surface coefficients | | | |
|---|---|---|---|---|---|
|  | k | A4 | A6 | A8 | A10 |
| R1 | −1.3851E−02 | −2.6540E−02 | 2.3007E−01 | −1.4536E+00 | 4.5378E+00 |
| R2 | −1.4464E+02 | −3.3608E−02 | −6.5822E−01 | 4.5408E+00 | −1.6844E+01 |
| R3 | 1.8164E+02 | −9.4020E−02 | 3.1390E−01 | −1.7587E−01 | −7.8857E−01 |
| R4 | 2.1498E+01 | −1.1077E−01 | 2.2925E+00 | −2.0349E+01 | 1.1035E+02 |
| R5 | −2.6847E+02 | −4.2224E−01 | 1.2383E+00 | −1.1035E+01 | 5.9514E+01 |
| R6 | 7.5585E+02 | −3.2132E−01 | 1.2726E−01 | 8.1662E−01 | −3.8220E+00 |
| R7 | 7.5215E+01 | −2.4072E−01 | 2.1134E−01 | −4.4064E−01 | 7.5947E−01 |
| R8 | −9.2555E−01 | 4.1135E−01 | −5.6546E−01 | 6.7238E−01 | −4.9264E−01 |
| R9 | −7.6159E+00 | −7.0837E−02 | 7.0682E−02 | −2.2114E−02 | 4.0913E−03 |
| R10 | −1.7050E+01 | −1.0990E−01 | 8.7580E−02 | −5.5131E−02 | 2.1090E−02 |

|  | Aspherical surface coefficients | | | | |
|---|---|---|---|---|---|
|  | A12 | A14 | A16 | A18 | A20 |
| R1 | −7.6931E+00 | 7.3015E+00 | −6.5318E+00 | 6.3885E+00 | −2.6154E+00 |
| R2 | 3.2147E+01 | −3.6411E+01 | 3.1362E+01 | −1.0452E+01 | −5.8946E+00 |
| R3 | 8.3379E−01 | −2.8721E+00 | 1.3254E+01 | 2.9811E+00 | −1.8504E+01 |
| R4 | −3.4682E+02 | 5.8501E+02 | −3.8660E+02 | −1.7936E+02 | 2.9316E+02 |
| R5 | −1.8480E+02 | 3.0588E+02 | −2.2181E+02 | 2.0045E+02 | −2.0192E+01 |
| R6 | 8.8500E+00 | −9.5421E+00 | 3.7355E+00 | 1.9465E−01 | −1.7165E−01 |
| R7 | −4.9083E−01 | 1.2760E−01 | −3.5268E−02 | −3.3599E−03 | 1.0338E−02 |
| R8 | 2.0889E−01 | −4.7130E−02 | 4.6812E−03 | −1.5104E−04 | −1.0880E−05 |
| R9 | −9.8177E−04 | 2.6888E−04 | −3.1524E−05 | −7.9634E−07 | 2.7597E−07 |
| R10 | −4.7891E−03 | 6.4066E−04 | −4.4545E−05 | 4.8183E−07 | 1.2736E−07 |

In table 10, K is a conic coefficient, and A4, A6, A8, A10, A12, A14, A16, A18 and A20 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20}$$

For convenience, an aspheric surface of each lens surface uses the aspheric surfaces shown in the above formula. However, the present disclosure is not limited to the aspherical polynomials form shown in the formula.

Table 11 and Table 12 show design data inflexion points and arrest points of the respective lenses in the camera optical lens 30.

TABLE 11

|  | Number(s) of inflexion points | Inflexion point position 1 | Inflexion point position 2 |
|---|---|---|---|
| P1R1 |  |  |  |
| P1R2 | 2 | 0.325 | 0.625 |
| P2R1 |  |  |  |
| P2R2 |  |  |  |
| P3R1 |  |  |  |
| P3R2 |  |  |  |
| P4R1 | 2 | 0.825 | 0.985 |
| P4R2 | 2 | 0.895 | 1.245 |
| P5R1 | 1 | 0.855 |  |
| P5R2 | 2 | 0.475 | 1.735 |

TABLE 12

|  | Number of arrest points | Arrest point position 1 | Arrest point position 2 |
|---|---|---|---|
| P1R1 |  |  |  |
| P1R2 | 1 | 0.535 |  |
| P2R1 |  |  |  |
| P2R2 |  |  |  |
| P3R1 |  |  |  |

TABLE 12-continued

|  | Number of arrest points | Arrest point position 1 | Arrest point position 2 |
|---|---|---|---|
| P3R2 |  |  |  |
| P4R1 |  |  |  |
| P4R2 |  |  |  |
| P5R1 | 1 | 1.575 |  |
| P5R2 | 2 | 1.075 | 2.015 |

In addition, the following Table 13 further lists the values corresponding to various parameters and conditions in Embodiment 3.

Figure 10:
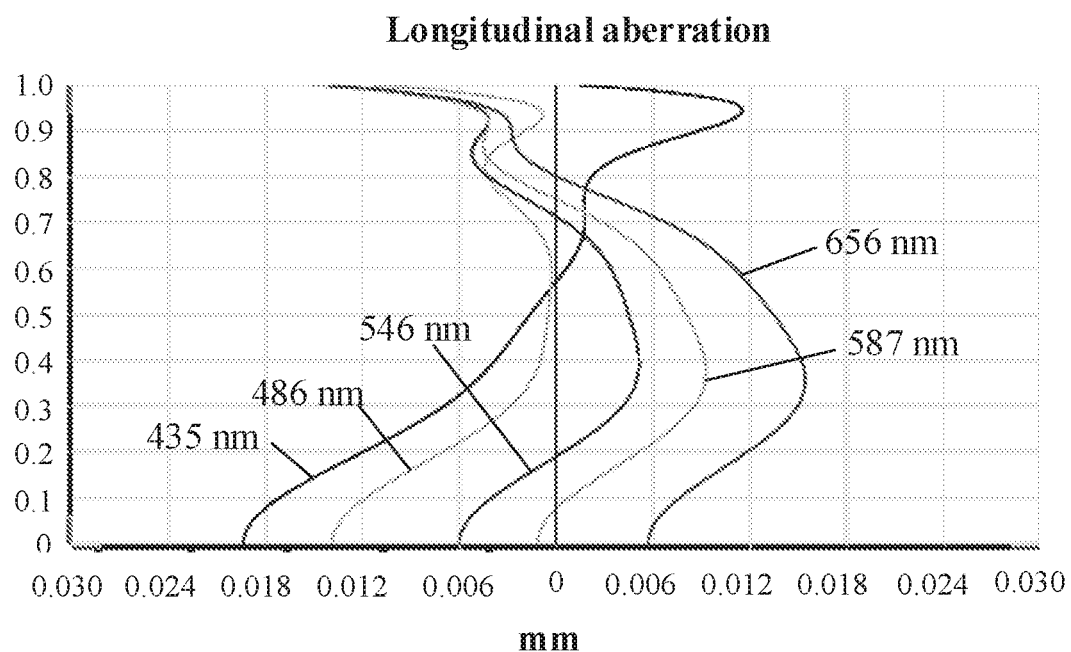
FIG. 10 is a schematic diagram of a longitudinal aberration of the camera optical lens shown in FIG. 9.
Figure 11:
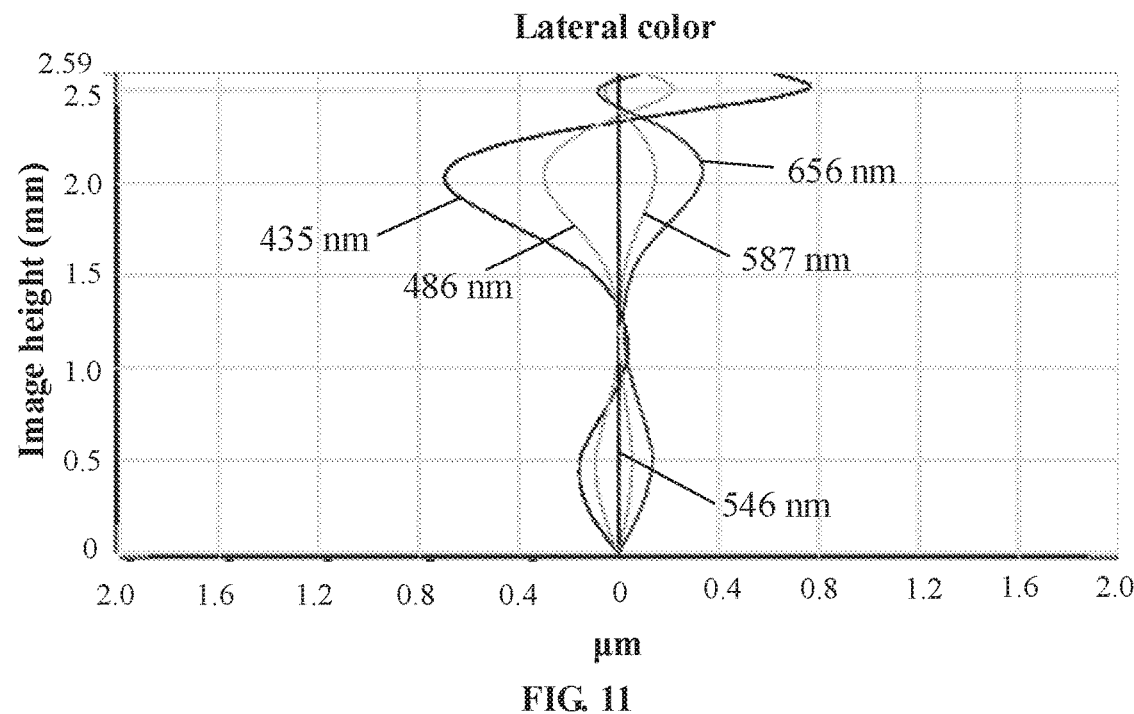
FIG. 11 is a schematic diagram of a lateral color of the camera optical lens shown in FIG. 9.
Figure 12:
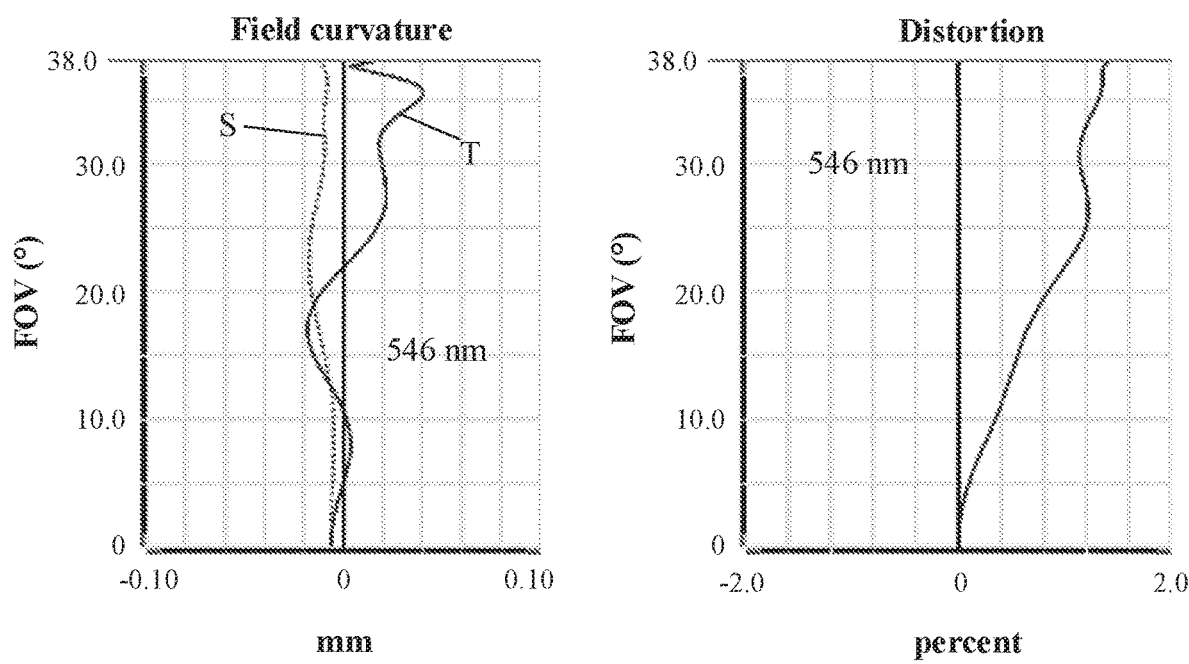
FIG. 12 is a schematic diagram of a field curvature and a distortion of the camera optical lens shown in FIG. 9.

FIG. 10 and FIG. 11 illustrate a longitudinal aberration and a lateral color with wavelengths of 435 nm, 486 nm, 546 nm, 587 nm and 656 nm after passing the camera optical lens 30, respectively. FIG. 12 illustrates a field curvature and a distortion with a wavelength of 546 nm after passing the camera optical lens 30. A field curvature S in FIG. 12 is a field curvature in a sagittal direction, and T is a field curvature in a tangential direction.

In an embodiment, an image height of the camera optical lens 30 is IH, a field of view is FOV, and an entrance pupil diameter is ENPD, where IH=2.59 mm, the FOV=76.00° in a diagonal direction, and ENPD=1.462. Thus, the camera optical lens 30 has a large aperture, ultra-thinness and wide angle, thereby achieving an excellent imaging performance.

The following table 13 lists the values of the corresponding parameters in Embodiment 1, Embodiment 2, and Embodiment 3 and conditions (1), (2), (3), (4) and (5) according to the above conditions.

TABLE 13

| Parameters and conditions | Embodiment 1 | Embodiment 2 | Embodiment 3 | Remarks |
|---|---|---|---|---|
| f1/f2 | −0.29 | −0.25 | −0.35 | Condition (1) |
| (f1 + f4)/f | 1.24 | 1.21 | 1.30 | Condition (2) |
| d1/f | 0.19 | 0.18 | 0.21 | Condition (3) |
| R3/f | 3.13 | 2.81 | 3.49 | Condition (4) |
| (R9 + R10)/(R9 − R10) | −0.26 | −0.28 | −0.24 | Condition (5) |
| f | 3.361 | 3.300 | 3.217 |  |
| f1 | 2.397 | 2.457 | 2.400 |  |
| f2 | −8.216 | −9.749 | −6.881 |  |
| f3 | −19.309 | −12.311 | −23.423 |  |
| f4 | 1.762 | 1.531 | 1.774 |  |
| f5 | −1.348 | −1.161 | −.428 |  |
| f12 | 3.003 | 3.005 | 3.159 |  |
| FNO | 2.20 | 2.20 | 2.20 |  |

F12 is a combined focal length of the first lens L1 and second lens L2.

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens comprising, from an object side to an image side:
a first lens having a positive refractive power;
a second lens having a negative refractive power;
a third lens having a negative refractive power;
a fourth lens having a positive refractive power; and
a fifth lens having a negative refractive power;

wherein the camera optical lens satisfies following conditions:

$-0.35 \leq f1/f2 \leq -0.25$;

$1.20 \leq (f1+f4)/f \leq 1.30$;

$0.18 \leq d1/f \leq 0.22$;

$2.80 \leq R3/f \leq 3.50$; and $-0.28 \leq (R9+R10)/(R9-R10) \leq -0.24$;

where
f denotes a focal length of the camera optical lens;
f1 denotes a focal length of the first lens;
f2 denotes a focal length of the second lens;
f4 denotes a focal length of the fourth lens;
d1 denotes an on-axis thickness of the first lens;
R3 denotes a curvature radius of an object-side surface of the second lens;
R9 denotes a curvature radius of an object-side surface of the fifth lens; and
R10 denotes a curvature radius of an image-side surface of the fifth lens.

2. The camera optical lens according to claim 1 further satisfying following condition:

$-0.45 \leq f5/f \leq -0.35$;

where
f5 denotes a focal length of the fifth lens.

3. The camera optical lens according to claim 1 further satisfying following conditions:

$0.36 \leq f1/f \leq 1.12$;

$-2.89 \leq (R1+R2)/(R1-R2) \leq -0.95$; and $0.08 \leq d1/TTL \leq 0.27$;

where
R1 denotes a curvature radius of an object-side surface of the first lens;
R2 denotes a curvature radius of an image-side surface of the first lens; and
TTL denotes a total optical length from the object-side surface of the first lens to an image surface of the camera optical lens along an optical axis.

4. The camera optical lens according to claim 1 further satisfying following conditions:

$-5.91 \leq f2/f \leq -1.43$;

$0.91 \leq (R3+R4)/(R3-R4) \leq 3.61$; and $0.03 \leq d3/TTL \leq 0.09$;

where
R4 denotes a curvature radius of an image-side surface of the second lens;
d3 denotes an on-axis thickness of the second lens; and
TTL denotes a total optical length from an object-side surface of the first lens to an image surface of the camera optical lens along an optical axis.

5. The camera optical lens according to claim 1 further satisfying following conditions:

$-14.56 \leq f3/f \leq -2.49$;

$-6.18 \leq (R5+R6)/(R5-R6) \leq -0.96$; and $0.04 \leq d5/TTL \leq 0.12$;

where f3 denotes a focal length of the third lens;

R5 denotes a curvature radius of an object-side surface of the third lens;

R6 denotes a curvature radius of an image-side surface of the third lens;

d5 denotes an on-axis thickness of the third lens; and

TTL denotes a total optical length from an object-side surface of the first lens to an image surface of the camera optical lens along an optical axis.

6. The camera optical lens according to claim 1 further satisfying following conditions:

$$0.23 \leq f4/f \leq 0.83;$$

$$0.52 \leq (R7+R8)/(R7-R8) \leq 1.86; \text{ and}$$

$$0.11 \leq d7/TTL \leq 0.39;$$

where

R7 denotes a curvature radius of an object-side surface of the fourth lens;

R8 denotes a curvature radius of an image-side surface of the fourth lens;

d7 denotes an on-axis thickness of the fourth lens; and

TTL denotes a total optical length from an object-side surface of the first lens to an image surface of the camera optical lens along an optical axis.

7. The camera optical lens according to claim 1 further satisfying following condition:

$$0.03 \leq d9/TTL \leq 0.20;$$

where d9 denotes an on-axis thickness of the fifth lens; and

TTL denotes a total optical length from an object-side surface of the first lens to an image surface of the camera optical lens along an optical axis.

8. The camera optical lens according to claim 1 further satisfying following condition:

$$FOV \geq 74.00°;$$

where

FOV denotes a field of view of the camera optical lens.

9. The camera optical lens according to claim 1 further satisfying following condition:

$$TTL/IH \leq 1.55;$$

where

TTL denotes a total optical length from an object-side surface of the first lens to an image surface of the camera optical lens along an optical axis; and IH denotes an image height of the camera optical lens.

* * * * *